C. MURNANE.
FARM TRACTOR.
APPLICATION FILED FEB. 10, 1919.

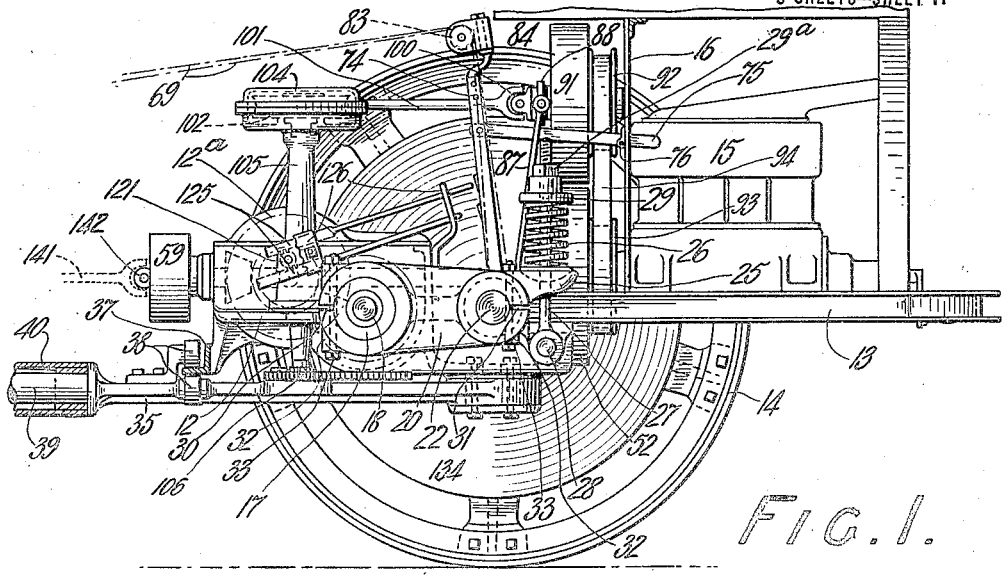

1,406,209.

Patented Feb. 14, 1922.
3 SHEETS—SHEET 2.

Inventor:-
Cornelius Murnane,
By:- B. Singer, Atty.

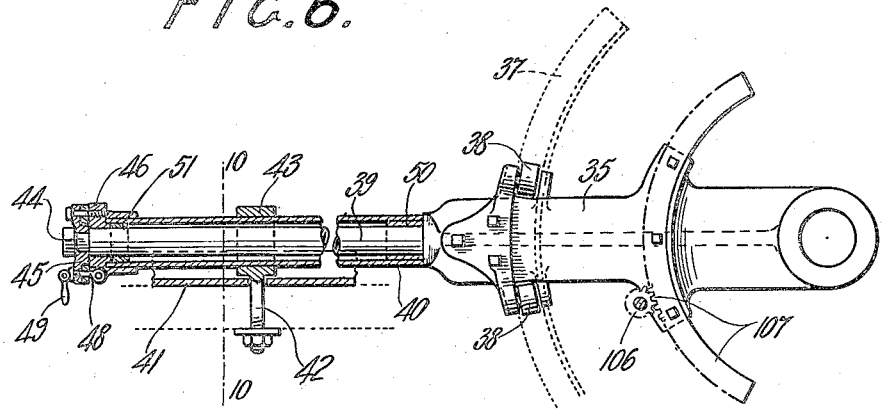

UNITED STATES PATENT OFFICE.

CORNELIUS MURNANE, OF CARLTON, NEAR MELBOURNE, VICTORIA, AUSTRALIA.

FARM TRACTOR.

1,406,209.

Specification of Letters Patent.

Patented Feb. 14, 1922.

Application filed February 10, 1919. Serial No. 276,138.

*To all whom it may concern:*

Be it known that I, CORNELIUS MURNANE, a subject of the King of Great Britain, residing at Carlton, near Melbourne, in the State of Victoria, Commonwealth of Australia, have invented certain new and useful Improvements in Farm Tractors, of which the following is a specification.

This invention relates to tractors for agricultural and like purposes, and it has been devised particularly in order to provide a light compact spring-mounted tractor which can be directly coupled to a farm waggon or agricultural implement for haulage purposes and is also adapted for driving stationary machinery.

Ordinarily a tractor is steered by means of a hand wheel operated by a person seated on the machine. This hand wheel is connected by suitable gearing to a pivoted forecarriage, and functions to turn the said forecarriage in desired directions. This method is slow in operation and requires considerable exertion on the part of the driver, especially when traversing rough and broken ground. An improved method of steering provides means such as friction brakes for braking the differential shafts of the tractor.

These friction brakes are located in each of the differential shafts, or alternatively in the traction wheels driven by the said shafts. By application of these brakes either of the traction wheels may be retarded so as to cause the tractor to turn in a desired direction. Constant application of the brakes however causes the brake bands and drums to wear rapidly, necessitating frequent costly renewals.

A salient feature of the present invention resides in the provision of steering means, operated by the engine through a transmission system distinct from and independent of the propulsive transmission system, the said separate transmissions being controlled by suitable means such as reins.

In the preferred embodiment of the invention a set of reins is employed to control the functions of the tractor, in a manner similar to that whereby a team of horses is controlled. The driver can either walk behind or be seated on the tractor, or on the machine or implement being hauled, and yet have complete control over the various operations.

The invention comprises essentially, a frame supported on a pair of traction wheels, an engine with transmission gearing on the said frame, a draw bar fulcrumed on the frame and adapted by attachment to a trailer or implement, to maintain said frame in an approximately horizontal position, steering means operated by the engine through transmission elements distinct from the propulsive transmission, and a set of reins for controlling both the propulsive and the steering transmission elements.

The traction wheels are preferably capable of relative vertical movement enabling them to rise and fall independently of each other as the other traverses a rough ground surface, the frame being thereby maintained in an approximately horizontal position.

Means are also provided whereby, when plowing, the positions of the traction wheel axles may be readily adjusted relatively to the frame in order to maintain the latter in a horizontal position and permit one of said wheels to run in the furrow while the other runs upon the land.

The invention, moreover, furnishes means whereby the tractor when hauling a harvesting machine can also have its engine connected to and arranged to drive the operative mechanism thereof.

In order that the invention may be readily understood, reference will now be had to the accompanying explanatory drawings wherein:—

Figure 1 is a view in side elevation of a tractor constructed in accordance with the invention, the off-side wheel being removed to enable the operative parts to be clearly seen.

Figure 2 is a view in plan and partly in horizontal section of the tractor shown in Figure 1.

Figure 6 is a view in plan of a detail of the invention showing the means whereby the direction of motion of the tractor is reversed.

Figure 7 is a fragmentary view of a detail of the invention hereinafter fully described.

Figure 8 is a view in plan and partly in horizontal section of the draw bar hereinafter fully described.

Figure 9 is an end view of the draw bar shown in Figure 8.

Figure 10 is a view in transverse section taken on the line 10—10 in Figure 8.

Figure 11 is a view in end elevation of a modified detail of the invention.

Figures 3, 4:
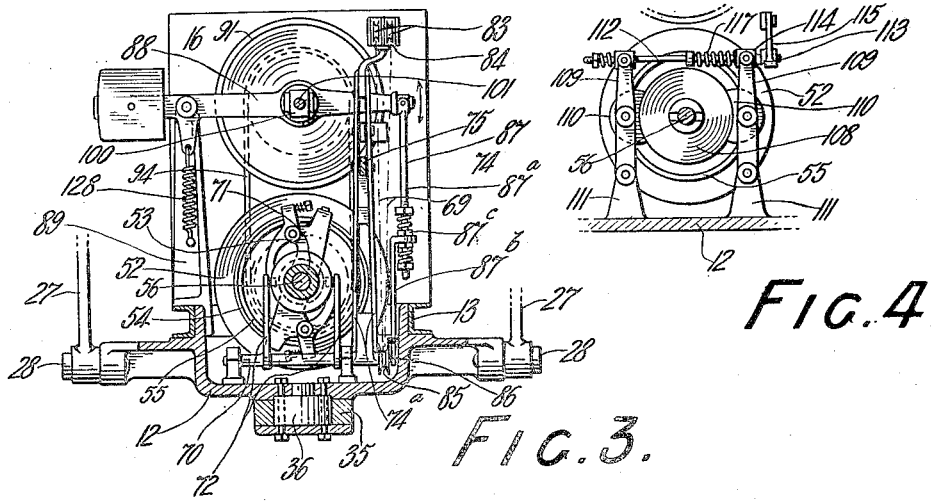
Figure 3 is a view in transverse section taken on the line 3—3 Figure 2.
Figure 4 is a detail view of a brake mechanism hereinafter fully described.

In these drawings like characters of reference denote similar or corresponding parts in the different views and the numeral 12 designates a main frame, preferably cast integrally of malleable iron or steel.

This frame 12 is provided with compartments which contain the change speed, reverse and differential gearing and it is provided with a detachable cover 12ª, the whole forming a dust-proof and oil-tight casing.

In the preferred form of the invention, a subsidiary frame 13 is situated symmetrically of the longitudinal centre line of the tractor and between a pair of traction wheels 14, is of U-shape and made from wrought steel. It is rigidly attached to the main frame 12 and extending forwardly therefrom, forms a seating for an engine 15 which may be of any approved design.

A suitable support, dashboard, or the like 16 is secured to said subsidiary frame 13 or alternatively to said main frame 12 and this support 16 forms a mounting for portions of the operative parts hereinafter described.

On the near and off sides of said main frame 12 and formed integrally therewith are two laterally extending hollow bosses 17. These bosses 17 are bored and bushed and differential shafts 18 are mounted revolvably therein. The outer surfaces of said bosses 17 are machined to fit holes 19 bored through the rear ends of near and off side swinging axle arms 20. These arms 20 are provided at their front ends with holes 21 bored parallelly to the holes 19 in their rear ends. The holes 21 in said front ends are provided with laterally projecting stub axles 22 on which the traction wheels 14 revolve. Final driving gears 23 hereinafter termed bullgears are secured to said traction wheels 14, and said gears 23 engage with and are driven by pinions 24 which are securely attached to the outwardly projecting ends of the differential shafts 18.

The front ends of the swinging axle arms 20 are formed with pocket seats 25 to receive the lower ends of helical springs 26. Tension rods 27 pass downwardly through these springs 26 and through holes in the centres of the pockets 25, and are pivoted on pins 28 fixed in opposite sides of said main frame 12. The upper ends of said tension rods 27 pass through caps 29 on top of said springs 26 and said rods 27 have long screwed ends with locknuts 29ª to allow for a vertical adjustment of the traction wheels 14 in relation to each other and to the tractor frame 12.

The swinging axle arms 20 are preferably made of malleable cast steel and their rear and front ends are split through as at 30 and 31 to said bored holes 19 and 21 respectively and are provided with suitable lugs 32 and cross bolts 33. Said cross bolts 33 in the front ends of said arms 20 when tightened up rigidly fix said stub axles 22 in place. The cross bolts 33 in the rear ends of said arms 20 can be adjusted to take up any wear or looseness therein, thereby keeping the traction wheels 14 in correct alignment whilst allowing the necessary swinging motion around the main frame bosses 17 in opposition to said springs 26 as the tractor passes over rough ground. The locknuts 29ª permit the operator to readily alter and adjust the level of said traction wheels 14 in order that one may run in the furrow when plowing.

Circumferential grooves 34 are formed around said bosses 17, and said bolts 33 engage therewith and prevent endwise displacement of the arms 20, and stub axles 22.

Though the means as hereinabove described for adjustably mounting the swinging arms 20 upon the bosses 17, and for securing the stub axles 22 in the ends of said arms 20 are preferred, any other means suitable for the purpose and known in the art may be employed for the purpose.

A draw bar 35 is pivotally attached under said main tractor frame 12 approximately at about its centre upon a pin 36 fixed therein and said draw bar 35 is free to swing in a horizontal plane only. A suitable arcuate guide flange 37 at the rear of said frame 12 engages guide rollers 38 on the draw bar 35 and always preserves the vertical relationship of the draw bar 35 to said frame 12 as the latter swings around the pivot pin 36.

The draw bar 35 extends from the back of the tractor and is coupled up to whatever is desired to be drawn by the latter.

When no load is required to be drawn a small two-wheeled truck or trailer (not shown) is secured to and functions to support the rear end of said draw bar 35. This truck may be used to carry the operator together with fuel and accessories.

To facilitate coupling up of different machine implements or waggons the extended end of the draw bar 35 is cylindrical as at 39 to receive a tubular coupling 40 which is free to rotate on and slide telescopically along said cylindrical portion 39 of the main draw bar 35. This allows a free swivelling action when the tractor and its load is passing over uneven ground and also allows the length of said draw bar 35 to be varied and be more readily adjusted to coupling tongues 41 of channel section such as will be permanently attached to the different machines and implements the tractor is adapted to haul.

This coupling tongue 41 is adapted to receive the tubular coupling 40 of the draw bar 35. Said tongue 41 is provided with a central hole to receive the shank 42 of a strong eyebolt 43 that is attached to said coupling 40. When this eyebolt 43 is tightened up the tubular coupling 40 on said draw bar 35 is drawn tightly into the channel seating of said tongue 41.

In order that a rigid connection may be ensured between said tubular coupling 40 and said channel tongues 41, it is essential that contact should be made only between the flange edges of the latter and the curved surface of the former, the eyebolt 43 not contacting with said tongues 41 at all. To more fully ensure this result, it is desirable that the flanges of the said tongue 41 contiguous to said eyebolt 43 be flared outwardly as is shown in Figure 10.

The rear end of the draw bar 35 is provided with a circumferential groove 44 which is adapted for engagement with a pair of draw plates 45, which are pivotally attached to a flange 46 or the like fixed to the end of said tubular coupling 40. These plates 45 are provided with slotted ends 47 which engage with and are clamped together by an eyebolt 48 pivoted in said flange 45 and having a suitable handle 49.

The telescopic connection of the tubular coupling 40 and the draw bar 35 facilitates the coupling of the latter to an implement or a trailer and in order that accidental disengagement of said draw bar 35 from said tubular coupling 40 may be obviated, a flange or collar 50 is formed on the latter and is adapted to contact with another collar 51 on said draw bar 35.

The flywheel of the engine 15 is provided with a friction clutch 53 preferably of the external type wherein a contracting band 54 is adapted to grip a brake drum 55 on the engagement of said clutch 53, the said brake drum 55 being fixed to or formed integrally with said flywheel 52. Alternatively, however the friction clutch 53 can be of any other approved type. A tail shaft 56 extends rearwardly from said clutch 53 in co-axial alignment with the crankshaft (not shown) of said engine 15, and said shaft 56 passes through the gear box portion of the tractor frame 12, across and over the differential shafts 18.

A semi-universal coupling, such as an "Oldham" coupling 56ᵃ, enables said shaft 56 to be easily removed, should it require attention, without disturbing the engine 15, and any variations in co-axial alignment between the engine shaft (not shown) and said tail shaft 56 are also thus provided for.

On said tail shaft 56 behind the differential shafts 18 two bevel clutch pinions 57 are mounted freely and between them a double-faced dog clutch 58 is slidably mounted and prevented from rotating on said shaft 56. The rear end of the tail shaft 56 extends out through the back of said frame 12 and carries a belt pulley 59 for driving stationary machinery. Suitable bearings are provided in the frame 12 to receive this shaft 56. Revolvably engaging said pinions 57 on the tail shaft 56 is a bevel gear wheel 60 which is fixed to the end of a lay shaft 61 arranged in parallel alignment with the differential shafts 18. Said bevel pinions 57 rotate this shaft 61 in either direction according to which one is engaged by the sliding dog clutch 58. Two change gear wheels 62 of different diameters mounted freely on this shaft 61 are provided with clutch teeth on their inner faces. A double-faced dog clutch 63 is slidably and non-rotatably fitted on said shaft 61 between these two wheels 62 and a small crank 64 engages in an annular groove 65. A shaft 66 carrying this crank 64 passes out through a bearing in the frame 12, and has a weighted lever 67 secured to it by means of which the clutch 63 can be moved into engagement with either of the gear wheels 62 as desired, and said weighted lever 67 will cause said clutch 63 to be retained in such set positions and prevent accidental disengagement thereof. Said lever 67 can in addition be provided with any approved locking means, if required, to prevent its displacement. This lever 67 is in full view of the driver and serves to indicate to him which gear is in operation.

A corresponding pair of gear wheels 68 on the differential shafts 18 mesh into said high and low speed change gear pinions 62, and the pinions 24 which are secured on the outwardly projecting ends of said differential shafts 18 engage with and are adapted to drive the bull-gears 23 on the traction wheels 14.

A pair of reins 69 is adapted to control the propulsive and steering operations of the tractor. A transverse rocking shaft 70 is mounted beneath the tailshaft 56 and a clutch shifting sleeve 71 is mounted on said tail shaft rearwardly of said flywheel 52. A pair of upwardly extending arms 72 attached to or formed integrally with said transverse shaft 70 engage with an annular groove 73 in said clutch sleeve 71. A main control lever 74 is secured to one end of said transverse shaft and a latch bar 75 is pivotally attached to said control lever 74.

This main control lever 74 is preferably made, as shown clearly in Figure 3, of two similar parts 74ᵃ which are fixed together and spaced apart by suitable distance pieces. When so constructed, said control lever 74 is well adapted for connection with various fittings hereinafter described.

Said latch bar 75 extends forwardly through the dashboard or support 16 and is adapted to slide upon a catch or pin 76 preferably provided with a roller to reduce friction.

A jaw or notch 77 is made in said latch bar 75 or in a piece 78 fixed thereto. This jaw 77 is adapted to be engaged with the pin 76 and thereby prevent the lever 74 from moving forwardly.

A spring 79 is attached at one end to a fixed part of the tractor, and at the other to a pivoted bell crank lever 80. Said bell crank lever 80 is connected by a link 81 to the control lever 74, and said spring 79 thereby exerts pressure upon the control lever 74 which tends to urge the latter forwardly.

A cam 82, is formed on the latch bar 75 or on the piece 78 fixed thereto, in advance of the jaw 77. Said cam 82 is not essential to the operation of said latch bar 75, but improves the action thereof as hereinafter described.

The reins 69 pass over sheaves 83 rotatably mounted in a swivel pulley block 84, and said reins extend downwardly and pass around a grooved pulley or crank disc 85 which is mounted upon and is free to rotate on said cross shaft 70.

If the reins 69 are pulled back and then released gradually so as to allow the lever 74 to move forward slowly under the action of said spring 79 the pin 76 will follow the contour of the cam 82 as the latter moves past the former, and said pin 76 will be engaged by the jaw 77 and prevent further forward movement of said latch bar 75 and main control lever 74.

When retained in this position the control lever 74 by means of arms 72 and sleeve 71 holds the engine clutch 53 out of engagement.

If the reins be released sharply the cam 82 will elevate the latch bar 75 and the jaw 77 will leap across the pin 76 and permit said latch bar 75 and main control lever 74 to move forwardly and engage the engine clutch 53.

Figure 5:
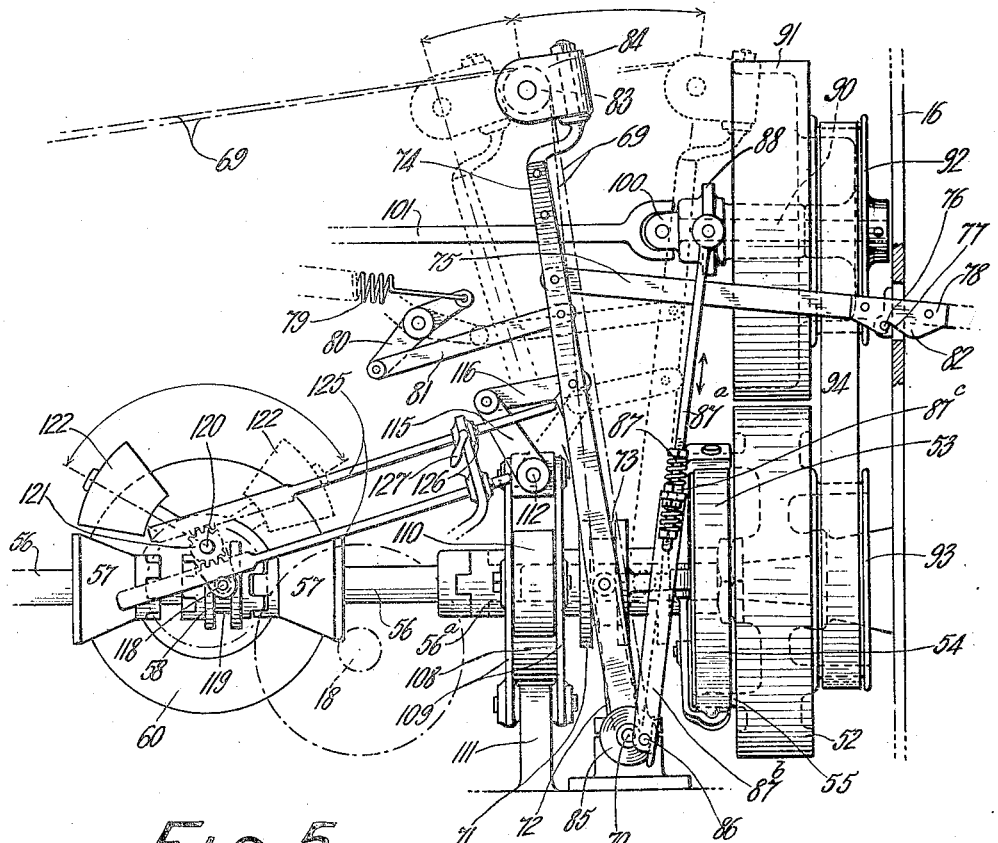
Figure 5 is a view in side elevation of the control mechanism drawn to a large scale and illustrating the action of said mechanism diagrammatically.

The bell crank lever 80 is arranged to be approximately in a "dead centre" position as shown by broken lines in Figure 5 when the control lever 74 is in its extreme forward position with the engine clutch 53 in engagement.

By this means a considerable pull must be exerted on the reins 69 when requiring to declutch the engine 15, and said control lever 74 will be unaffected by the light tensions on the reins 69 required for steering as hereinafter described.

Said grooved pulley 85 is provided with a crank pin 86, the latter being preferably capable of radial adjustment, by any well-known means, in order to vary the length of the stroke of a connecting rod 87 attached thereto.

Said connecting rod 87 extends upwardly to a balanced rocking arm 88 which swings in a vertical plane behind the dashboard 16 and above the flywheel 52 of the engine 15.

This rocking arm 88 can be pivoted on the dashboard 16 or on a support as 89 shown in Figure 3.

The connecting rod 87 can be made in one piece as shown in Figure 1, but is preferably made in two parts 87$^a$ and 87$^b$, as shown in Figures 3 and 5. These two parts 87$^a$ and 87$^b$ can be adjusted relatively to each other in order to vary the length of said rod 87 and adjust the position of said arm 88. Locknuts or like devices are used to secure said parts 87$^a$ and 87$^b$ in a set adjusted position.

The two parts 87$^a$ and 87$^b$ can, if required, be resiliently connected together: in which case the upper part 87$^a$ passes through a guiding sleeve 87$^c$ fixed in the upper end of the lower part 87$^b$ as shown in Figures 3 and 5.

A shaft 90 rotatably mounted in said arm 88 supports a large friction wheel 91 which carries a flanged belt pulley 92 and a similar pulley 93 is secured to the inner side of the flywheel 52 and a belt 94 passes around said pulleys 92 and 93. When either the right or left rein 69 is pulled the grooved pulley 85 will oscillate about half a revolution and the connecting rod 87 will accordingly either press the friction wheel 91 against the face of the flywheel 52 or move it away therefrom. In the latter case the belt 94 is tightened on the flanged pulleys 92 and 93 and an opposite motion is imparted to the friction face wheel 91 to that which it receives when pressed directly against the flywheel 52.

The movements of the connecting rod 87 are limited in either direction by a flange 95 which projects from the side of and extends beyond the end of said connecting rod 87. This flange 95 contacts with a boss 96 formed on said grooved pulley 85 when the connecting rod 87 is in either of its extreme positions. In lieu of the flange 95, a stop 97 rigidly secured to the main frame can be employed to limit the movements of the connecting rod 87.

The portion of the reins 69 which passes around the grooved wheel 85 is preferably a light bicycle or similar chain 98. This chain 98 is positively connected to said pulley 85 by a pin or setscrew 99 passed radially through one of the links thereof. Said pin or setscrew 99 if preferred can pass transversely through the opposite walls of the grooved wheel 85, and the chain 98 can be attached to said pin 99 in any approved way. This positive connection of the reins 69 to said grooved wheel 85 obviates slipping and wear arising from the same, and enables said wheel 85 to be oscillated through approximately half a revolution. The other parts of the reins 63 can be made of any suitable flexible material as rope, leather, chain or wire.

When said rod 87 is in either of its extreme positions it is somewhat "over centered" as shown in Figure 7 and will retain either the friction wheel 91 or pulleys 92 and 93 in operation until the opposite rein 69 to that connected therewith is pulled.

The friction wheel 91 and attached pulley 92 are connected by said shaft 90 and a universal joint 100 to a horizontal shaft 101 which extends backwardly therefrom. This shaft 101 at its rear end is connected as by a universal joint (not shown) to a worm shaft (not shown) carrying a worm engaging with a worm wheel 102 keyed to the top of a vertical shaft 103. The worm shaft and the worm wheel 103 are enclosed in grease-tight casings 104 and said shaft 103 passes downwardly through casing 105 and bearings (not shown) in the main frame 12 and has a pinion 106 keyed to its lower end. This pinion 106 meshes into an arcuate toothed rack 107 firmly attached to the draw bar 35 and adapted to swing with it in a horizontal plane.

A brake wheel 108 is secured to the tail shaft 56 immediately behind the clutch shifting sleeve 71 and a pair of vertical post brakes 109 furnished with shoes 110 are pivoted at their bottom ends on lugs 111 attached to or formed integrally with said main frame 12. These post brakes 109 extend upwardly above said brake wheel 108 and are connected together at their upper ends by a rocking cam shaft 112 which passes transversely across the top of said brake wheel 108. This cam shaft 112 is provided with a cam 113 which is adapted to co-act with a stationary cam 114 fixed to one of said post brakes 109. Said rocking cam shaft 112 is attached to the main control lever 74 by means of a crank arm 115 and a connecting link 116.

The preferred form of brake 109 has been herein described, but the brake wheel 108 can alternatively be furnished with any other suitable device as for instance a band brake.

When the main control lever 74 is pulled back by the reins 69 thereby disengaging the engine clutch 53, a further backward pull will cause the brake shoes 110 to be applied to the brake wheel 108.

It will be understood that the post brakes 108 and the engine clutch 53 act opposedly, since both are connected to the main control lever 74. When the main control lever 74 is released by the reins 69 and permitted to move forwardly under the action of said spring 79, the brake shoes 110 are removed from brake wheel 108 and the engine clutch 53 is engaged.

The parts of the post brakes 109 and of the engine clutch 53 are adjusted to provide a required amount of free movement of the main control lever 74 between the release of said clutch 53 and the application of the brake shoes 110 to the brake wheel 108, and between the removal of said shoes 110 and the re-engagement of said clutch 53.

A spring 117 placed over the cam shaft 112 between the post brakes 109 is arranged to push the latter apart when the engine clutch 53 is re-engaged.

The gear shifting from forward to reverse is effected by means of a small crank 118 preferably having a roller thereon engaging the annular groove 119 in the sliding reversing clutch 58 between said bevel pinions 57 mounted freely on the tail shaft 56. A shaft 120 carrying said crank 118 extends outwardly through suitable bearings and has rigidly fixed to it a small toothed pinion 121. On the end of said shaft 120 and alongside said pinion 121 a weighted tumbler arm 122 is loosely fitted.

Said tumbler arm 122 is provided with jaws 123 which are adapted for engagement with teeth 124 formed on the end of said pinion 121, and said jaws 123 are made somewhat wider or of greater circumferential length than said teeth 124.

The excess width of said jaws 123 over the teeth 124, provides the tumbler arm with a required amount of lost motion around said shaft 120.

This lost motion permits said arm 122 to be thrown past its vertical or central position, even though the teeth of the pinion 57 and clutch 58 are in contact end to end. The tumbler arm 122 will then by its weight at once engage said clutch 58 and pinion 57 as soon as the teeth thereof move into correct alignment.

Two rack bars 125 slidably mounted in guides 126 engage said pinion 121 on opposite sides thereof. These rack bars 125 extend forwardly and upwardly toward the main control levers 74, and when the latter is swung backwardly to the extreme limit of its travel it will strike the end of one or the other of said rack bars 125 and rotate the pinion 121 and the crank shaft 120 thereby shifting the dog clutch 58 from forward to reverse or vice versa. The loosely mounted weighted tumbler arm 122 is thrown over the centre as the rack bar 125 is suddenly struck by said lever 74, and said weighted arm 122 will thereby ensure the engagement of said clutch 58 with one or other of said pinions 57. Said rack bars 125 are geared with the pinion 121 in such manner that when one of said bars 125 is back, the other one will be fully extended towards the control lever 74 in readiness to be thrown backwardly thereby when a change of direction of motion is required. Said tumbler arm 122 is in full view of the driver and in addition to its action in engaging said clutches 58 with the pinions 57, it also forms an indicator which shows whether the tractor is in forward or reverse gear.

A clamp is provided for locking said forward and reverse gears in a neutral position when the tractor is used for driving stationary machinery.

The method of control of the tractor is as follows:—

The engine clutch 53 is disengaged and the brake shoes 110 are applied to the brake wheel 108 by pulling both reins, 69 simultaneously backwards, the jaw 77 of the latch bar 75 being allowed to lock on said pin 76. The engine 15 is now started and runs with its speed controlled by a governor of a suitable design. A sharp pull back and quick release of the reins 69 will cause the jaws 77 of the latch bar 75 to leap across the locking pin 76 whereupon the spring 79 will force the control lever 74 forward thereby releasing the brake shoes 110 and engaging the clutch 53 as hereinbefore described. The tractor will now move forwardly assuming it to be in forward gear. When the reverse motion is required both reins 69 are pulled backwardly thereby disengaging the clutch 53 and applying the brake shoes 110 to the brake wheel 108. A further sharp backward pull on the reins 69 causes the control lever 74 to strike the end of the reverse gear rack bar 125 and push the dog clutch 58 from forward to reverse gear as hereinbefore described. The engine clutch 53 is again let in by releasing the reins 69 and the tractor will now move backwards. A pull of the left-hand rein 69 causes the belt 94 to rotate the shaft 101 in the same direction as the engine 15 and steer the tractor to the left. A pull on the right-hand rein 69 causes the friction wheel 91 to come in contact with the face of the flywheel 52 and the shaft 101 to rotate in the opposite direction to the engine thereby steering the tractor to the right. A spring 128 always keeps the rocking arm 88 in a neutral position, so that neither the friction wheel 91 nor the belt 94 is operative except at such times when either the right or left-hand rein is pulled singly. The movement for steering of the tractor can be effected while the same is either moving or standing.

In the latter case, the brake shoes 110 hold the transmission gearing stationary, and the pinion 106 functions with the arcuate rack 107 to cause the tractor to turn to either the left or right about the fulcrum pin 36 of the draw bar 35 as centre from lock to lock without moving the load attached to the draw bar 35.

The differential wheels 68 are fixedly held by said brake shoes 110 thereby permitting the differential pinions to turn upon their shafts and allowing the traction wheels 14 to roll freely as the tractor moves around from one lock to the other.

The swivelling or steering of the tractor, in either direction while it remains stationary will be found of great service in turning sharp corners and in getting out of awkward places.

The swivel double sheave block 84 on top of the control lever 74 allows the reins 69 to extend from it to the seat of any implement or machine the tractor is pulling and upwardly to a load of hay on a waggon. This gives the driver full control of the tractor and also allows him to attend to and adjust the machine or implement being hauled in the same manner as when driving a team of horses.

The main control lever 74 can be operated by the reins 69 from positions on either side of the longitudinal centre line even though the angularity thereby resulting is considerable.

When the tractor is being used for operating a stationary machine, the reins 63 can be extended to the latter or to a point convenient to the operator. For this purpose guide pulleys (not shown) fixed to a convenient part of the machine, as for example the casing 104 can be provided to direct said reins 69. When so arranged, said reins 69 in conjunction with said clutch 53 and brake wheel 108 form a convenient controlling gear by means of which the said stationary machine can be started or stopped as desired, thereby avoiding the necessity of providing special operating gear on said machine.

It is highly desirable that the bull-gears 23 on the traction wheels 14 and their driving pinions 24 should be enclosed in dust-proof and grease-tight covers. Ordinarily such gears and pinions are quite unprotected and are subject to rapid wear as dust and grit are not excluded from the gear teeth: furthermore, as it is difficult to retain oil or grease thereon, said gears frequently operate in a dry state.

To obviate these disadvantages, the hub 129 of each tractor wheel 14 is provided with a turned seating 130 upon which is revolvably fitted a sleeve 131 formed integrally with a casing 132. This casing 132 protects the outer side of the bull-gear 23 and encases the outer circumference thereof.

Said casing 132 is provided with a flange 133 which forms a seating for a circular cover plate 134. This plate 134 is attached by approved means such as bolts and nuts (not shown) to said flange 133.

The differential shaft 18 extends through a hole 135 made in the plate 134, and said plate 134 is firmly attached to said swinging axle arm 20 by bolts or the like.

The bull-gear 23 is provided with a central bored hole which fits over the inner portion of the hub 129 and said bull-gear 23 beds upon a shoulder 136 thereon. Said bull gear 23 is securely fixed to said hub 129 by means of bolts 137.

The casing 132 and disc cover 134 completely enclose the bull-gear 23 and pinion 24, thoroughly exclude dust and grit therefrom, and enable said gears to be run in grease or other suitable lubricant.

In a modification of the steering mechanism another friction wheel 138 is used instead of the belt 94 and pulleys 92 and 93. In this arrangement the rocking arm 88 is pivoted at its centre upon a pin 139 or the like fixed in the dashboard or support 16.

The friction wheels 91 and 138 are rotatably mounted on pins or axles fixed in said arm 88 upon opposite sides of and at equal distances from the pivot pin 139, said friction wheels thereby balancing each other.

Said friction wheels 91 and 138 contact with each other, and the pin or axle supporting the friction wheel 138 can be furnished with adjusting means in order that the pressure between said wheels 91 and 138 may be varied. The friction wheel 138 can be, if required, slidably mounted upon said arm 88 and can be caused to continuously bear upon the friction wheel 91 by means of a spring 140.

The connecting rod 87 is attached to the arm 88, as hereinbefore described, or if preferred said rod 87 can be attached to the pin or axle on which one of said friction wheels 91 and 138 is mounted.

One of the wheels as 91 is connected to the horizontal shaft 101 and when one of the reins 69 is pulled the friction wheel 91 which is connected to the shaft 101 is brought into contact with the face of the flywheel 52 and motion is imparted to it in the opposite direction to that of said flywheel 52. When the other rein 69 is pulled the arm 88 is rocked and the other friction wheel 138 is brought into contact with said flywheel 52, thereby imparting to the wheel 91 and the shaft 101 a motion in the same direction as the flywheel. In a mid position both wheels 91 and 138 are clear of the flywheel 52 and remain stationary.

Where it is desirable to drive the mechanism of a machine, such as a reaper and binder, or harvester, directly from the engine 15 while at the same time hauling it, a telescopic shaft 141 shown by broken lines in Figure 1 is connected to the tail shaft 56 by a universal coupling 142. Said shaft 141 is connected at its opposite end by a similar universal coupling to the machine or implement shaft that is to be driven. The universal couplings and telescopic shaft allow the motion to be transmitted from the tractor to the machine whether going straight or turning, or passing over uneven ground.

A narrow-faced flanged winding drum 143 is secured by the bolts 137 outside the hub 129 of one traction wheel 14 and is adapted to carry a steel wire rope (not shown). By blocking this wheel 14 clear of the ground the tractor can be used as a stationary winch and if said tractor should become bogged, as in marshy land, the winding drum 143 and rope can be used to haul it out. The tractor can also be made without the spring mountings 26, the stub axles 22 being then rigidly attached to main frame 12, or alternatively a cranked axle passing right across under the main frame 12 and rigidly attached thereto may be used in place of the stub axles 22.

In the foregoing specification the tractor has been described as driven by a pair of reins 69 whereby the movements of the lever 74, and grooved wheel 85 are controlled, but these parts may also be adapted to be operated directly without the use of reins by a person seated on the said tractor.

What I do claim is:

1. A tractor comprising a frame, traction wheels supporting said frame, means for the independent vertical adjustment of said traction wheels, a propulsive motor mounted on said frame, steering mechanism on said frame, propulsive gearing on said frame engaging said traction wheels, distinct and independent transmission elements connecting said propulsive motor with said steering mechanism and with said propulsive gearing, and a set of reins controlling said independent transmission elements.

2. A tractor comprising a frame, a pair of traction wheels supporting said frame, means for the independent vertical adjustment of said traction wheels, means for maintaining said pair of traction wheels in parallel alignment with each other during and after said independent vertical adjustment, means for locking said traction wheels in set relative vertical positions after adjustment, a propulsive motor on said frame, steering mechanism on said frame, propulsive gearing on said frame engaging said traction wheels, distinct and independent transmission elements connecting said propulsive motor with said steering mechanism and with said propulsive gearing, and a set of reins for controlling said independent transmission elements.

3. A tractor comprising a frame, a pair of traction wheels supporting said frame, means for the independent vertical adjustment of said traction wheels, a resilient connection between said traction wheels and said frame, a draw-bar pivoted on said frame, a propulsive motor on said frame, steering mechanism on said frame, propulsive gearing on said frame engaging with said traction wheels, distinct and independent transmission elements connecting said propulsive motor with said propulsive gearing, and a set of reins for controlling said independent transmission elements.

4. A tractor comprising a frame, a pair of traction wheels supporting said frame, resilient connections between said frames permitting independent relative vertical movement of said traction wheels, a screw connection between each of said traction wheels and said frame for the independent vertical adjustment of said traction wheels, a draw-bar pivotally attached to said frame, attachment means on said draw-bar for securing to a trailer element, a propulsive motor mounted on said frame, steering mechanism mounted on said frame and transmission elements connecting said propulsive motor to said steering mechanism.

5. A tractor comprising a main frame, a pair of traction wheels resiliently supporting said main frame, a subsidiary frame secured to said main frame, an engine mounted on said subsidiary frame, a gear case in said main frame, propulsive transmission gearing in said gear case and connecting said engine with said traction wheels, an arcuate guide on said main frame, a pivot at approximately the centre of said main frame, a draw-bar movable about said pivot, rollers on said draw-bar contacting with said arcuate guide, steering mechanism on said frame, and independent transmission elements connecting said steering mechanism with said engine.

6. A tractor comprising a main frame, a pair of bosses extending from said frame and on opposite sides thereof, bearings in said bosses, differential shafts in said bosses, a pair of swinging arms mounted on said bosses, a traction wheel revolvably mounted on each of said swinging arms, an annular gear on each of said traction wheels, drive pinions on said differential shafts engaged with said annular gears, a gear box in said main frame, a subsidiary frame secured to said main frame, an engine mounted on said subsidiary frame, a tail shaft rotatably mounted in said main frame, in co-axial alignment with the main shaft of said engine and connected thereto, a clutch effecting connection between said tail shaft and said main shaft, opposed bevel pinions mounted freely on said tail shaft and within said gear case, a clutch on said tail shaft connecting either of said bevel pinions with said tailshaft, a lay shaft mounted in said gear case, a bevel gear on said lay shaft in engagement with said bevel pinions, a set of change speed gears mounted freely on said lay shaft, a clutch connecting either of said gears to said lay shaft, gear wheels on said differential shafts engaged with said change speed gears, steering mechanism on said main frame, and transmission elements distinct and independent from said propulsive transmission gearing, connecting said steering mechanism to said engine.

7. A tractor comprising a frame, a pair of traction wheels resiliently supporting said frame, a guide on said frame, a draw-bar pivotally attached to said frame, rollers on said draw-bar contacting with said guide, an engine mounted on said frame, propulsive gearing mounted on said frame and engaged with said traction wheels, transmission elements connecting said propulsive gearing with said engine, steering mechanism mounted on said frame, a rotary member on the main shaft of said engine, a pulley on said main shaft, a balanced member pivoted in said frame, a friction wheel rotatably mounted on said balanced member, a pulley arranged on said friction wheel, a belt connecting said pulley on said friction wheel with said pulley on said main shaft, a flexible connection between said friction wheel and steering mechanism, means for placing said friction wheel in peripheral contact with said fly-wheel, means for tautening the said belt connection, and means for maintaining said balanced member in a neutral or balanced position.

8. A tractor comprising a frame, a pair of traction wheels resiliently supporting said frame, an annular gear on each of said traction wheels, differential shafts rotatably mounted in said frame, a drive pinion on the outer end of each of said differential shafts engaged with said annular gear, an engine mounted on said frame, a tail shaft rotatably mounted in said frame, a clutch connecting said tail shaft with said engine, opposed bevel pinions mounted freely on said tail shaft, a clutch on said tail shaft connecting either of said bevel pinions with said tail shaft, a transverse lay shaft mounted rotatably in said frame, a bevel gear wheel secured on said lay shaft engaged with said bevel pinions, a set of change speed gears mounted freely on said lay shaft, a clutch connecting either of said gears to said lay shaft, gears on said differential shafts engaged with said change speed gears, a brake on said tail shaft, a lever pivoted in said frame, sheaves or pulleys revolvably fitted in the top of said lever, control reins passed around said sheaves, an operating connection from said pivoted lever to said engine clutch, an operating connection from said lever to said brake, and reversing clutch shifting means operated by said rein controlled lever.

9. A farm tractor having a main frame, traction wheels supporting said frame, an engine on said frame, a propulsive transmission system connecting the engine with said traction wheels, differential gearing in said propulsive transmission system, a clutch between said engine and said propulsive transmission system, a steering pivot on said frame, steering means operated by the engine independently of said propulsive transmission system and a brake holding the said differential gearing when turning the tractor about said steering pivot without forward or backward motion.

10. Means controlling the functions of a tractor, comprising a lever pivoted at its lower end in the frame of said tractor, a latch bar pivotally attached to said lever, a slot in said latch bar, a cam surface on said latch bar, a pin or catch projecting from the frame of said tractor, and in the path of said latch bar, an engine clutching connection on said lever, a brake operating connection on said lever, a spindle rotatably mounted in the frame of said tractor, a gear pinion secured on said spindle, a clutch lever connected to said spindle and engaged with the reversing clutch of said tractor, a weight on said clutch lever, a pair of racks slidably mounted in the frame of said tractor, one on either side of and engaged with said pinion, the said racks being in the path of movement of and adapted to be moved by said control lever, a cranked disc pivotally mounted in the frame of said tractor, a belt pulley secured on the engine shaft of said tractor contiguous to the flywheel of said engine, a balanced member pivotally mounted in the frame of said tractor, a friction wheel rotatably mounted on said balanced member and opposed to the periphery of the flywheel of said engine, a shaft connecting said friction wheel to the steering mechanism of said tractor, a belt pulley arranged on said friction wheel, a belt connecting said belt pulley with said engine belt pulley, a connecting rod from said cranked disc to said balanced member, yieldable means to normally maintain said friction wheel and said belt out of action, a pair of sheaves rotatably mounted on the free end of said control lever and a pair of reins passing around said sheaves, having one end secured to said cranked disc.

11. Means controlling the functions of a tractor comprising in combination, a clutch, a reversing gear, a braking means, a control lever, a connection between said lever and said clutch and braking means, means operated by the movement of said control lever to operate said reversing gear, a pulley block pivoted to the upper end of said control lever, a pair of sheaves revolvably mounted in said pulley block, a wheel rotatably secured to the frame of the tractor, and a pair of reins passing over said sheaves and around and connected to said wheel, steering mechanism, power transmitting means for said steering mechanism, and a connection between said wheel and said power transmitting mechanism for controlling the operation of said steering mechanism.

12. In a farm tractor, a frame, traction wheels supporting said frame, an engine on said frame, a tail shaft mounted rotatably in said frame, a clutch connecting said tail-shaft with said engine, a brake on said tail-shaft, a rotary transmission member on the outer end of said tail-shaft, a lever controlling said clutch and brake, and reins operating said lever.

13. In a farm tractor, a frame, a pair of traction wheels resiliently supporting said frame and means for the independent vertical adjustment of said traction wheels and for the locking of such adjustment comprising, a pair of bosses extending outwardly from and on opposite sides of said frame, a swinging axle arm pivoted on each of said bosses, clamp bolts through said swinging arms, stub axles fitted in said swinging arms, a pocket seat in each of said swinging arms, tension rods pivotally connected to said frame, springs on said rods and seated within said pocket seats, a screwed portion on said tension rods, a retaining cap and a locknut on each of said rods.

In testimony whereof I affix my signature in presence of two witnesses.

CORNELIUS MURNANE.

Witnesses:
JAMES H. ANDERSON,
MARGARET ROSSITER.